March 22, 1966 V. L. PEICKII 3,241,846
FLUID SEAL
Original Filed April 2, 1956 2 Sheets-Sheet 1
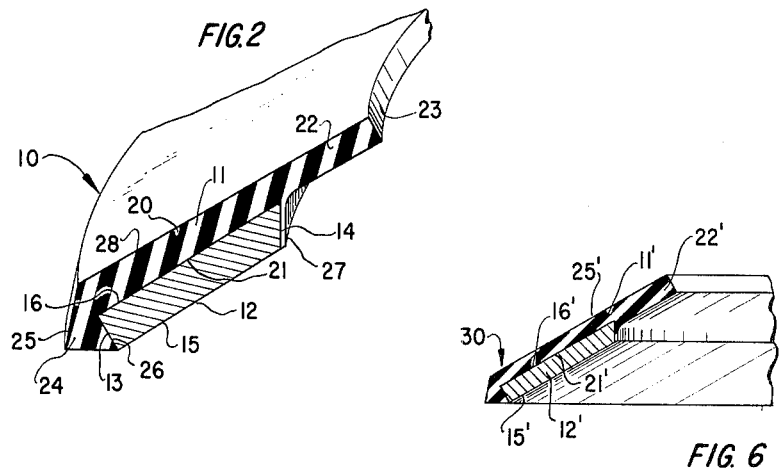
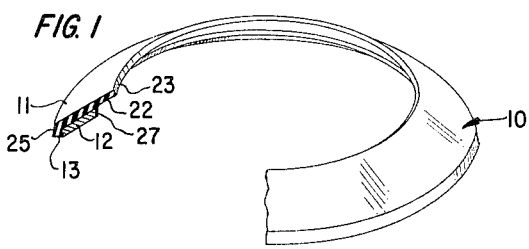
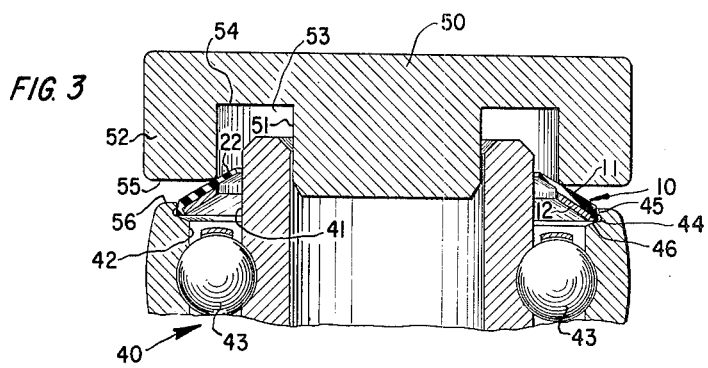

March 22, 1966  V. L. PEICKII  3,241,846
FLUID SEAL

Original Filed April 2, 1956                                2 Sheets-Sheet 2

United States Patent Office 3,241,846
Patented Mar. 22, 1966

3,241,846
FLUID SEAL
Vasalie L. Peickii, Hillsborough, Calif., assignor to Federal-Mogul Corporation, Detroit, Mich., a corporation of Michigan
Continuation of application Ser. No. 72,609, Nov. 30, 1960, which is a continuation of application Ser. No. 575,659, Apr. 2, 1956. This application May 14, 1964, Ser. No. 367,523
14 Claims. (Cl. 277—235)

This application is a continuation of application Serial No. 72,609 filed November 30, 1960, now abandoned, which is a continuation of application, Serial No. 575,659, filed April 2, 1956, naw abandoned.

This invention relates to an improved fluid seal and particularly to one for use with ball bearings and the like. It also relates to a ball bearing assembly incorporating a novel type of lubricant sealing member.

One object of the present invention is to solve the problem of sealing lubricant within a ball bearing assembly and sealing against the entry of dust and dirt thereinto, without altering the spacing between the bearing members. Heretofore, the installation of a sealing member in the ball bearing assembly has tended to change the spacing between the inner and outer races of the bearing, because the outer periphery of the rigid metal reinforcing member that supports the resilient sealing lip has normally been used to locate the seal in the bearing. The present invention solves this problem by providing a seal having a rubber outer periphery that locks the seal into position without affecting the spacing between the bearing races. At the same time, a tighter seal is obtained due to the gasketing action of the rubber outer periphery between the outer bearing race and the metal reinforcing member.

Another object of the invention is to provide a wafer-type seal for ball bearings and other installations, which is easily installed, inexpensive to manufacture, and which when installed will retain its position.

Another object is to provide a dished wafer-type seal that is straightened, cocked or undished when installed, therby setting up a novel gasketing action at one periphery and the desired shaft interference at the other periphery.

Other objects of the invention are to provide a ball-bearing assembly including means for locking thereto a fluid-sealing member, and to provide a fluid-sealing member adapted to be maintained by locking means in a ball bearing assembly.

Other objects and advantages of the invention will appear from the following description of a preferred embodiment thereof presented in accordance with 35 USC 112.

In the drawings:

FIG. 1 is a view in perspective of a fluid seal embodying the principles of the present invention, with part of the seal broken away and shown in section;

FIG. 2 is an enlarged fragmentary view of a portion of FIG. 1;

FIG. 3 is a view in elevation and in section showing the seal of FIG. 1 about to be locked into a ball bearing assembly with the aid of a special seal-installation tool;

FIG. 6 is a view similar to FIG. 2 on a smaller scale, of a modified form of the invention.

Figure 4:
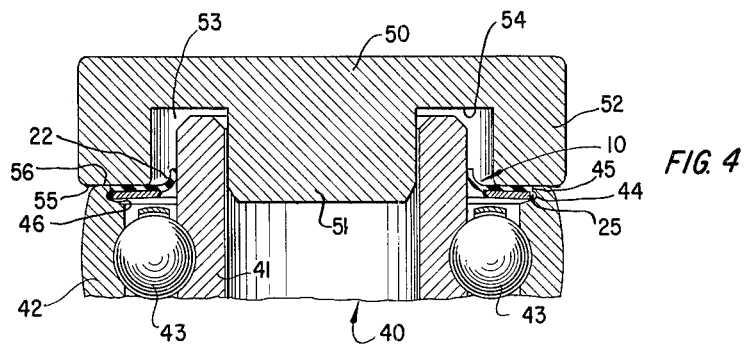
FIG. 4 is a view similar to FIG. 3 with the installation tool moved in to force the seal into its locked position.

Before installation, the seal 10 shown in FIGS. 1–5 comprises a rubber sealing element 11 bonded to a dished metal ring 12 and extending beyond it on both the inner and outer periphery. The dished metal ring 12 is preferably formed from relatively soft metal, such as drawing steel, and definitely not from spring steel. A flat ring is initially stamped out from a flat sheet, with its outer periphery 13 initially out to its final size. The ring is then dished to an angle of approximately 30 degrees, preferably within about plus or minus 5 degrees, resulting in the shape shown in FIGS. 1 and 2. The soft metal will retain that shape without springing back, since some metal flows during the forming operation. Then the inner pierce 14 is cut to the exact size desired, which depends on the size of the inner race, shaft, or other inner cylindrical element with which the seal 10 is to be used. Since the inner pierce 14 is made after the dishing operation, the peripheral edge is axial relative to the dished ring 12 and oblique relative to the outer periphery 13 and the conical side faces 15 and 16 (the face 15 being the inner conical side and the face 16 the outer side).

Preferably, the rubber element 11 is molded directly on the ring 12 to provide an extended conical portion 20 bonded along one face 21 to the ring face 16 and a lip portion 22 extending radially inwardly beyond the pierce 14 and terminating in an inner periphery 23. The length of the lip portion 22 is proportioned to provide the proper shaft interference for the installed seal. An outer peripheral portion 24 of the rubber element 11 extends out beyond the peripheral edge 13 of the ring 12 and preferably terminates at an angle in an outer periphery 25 that lies approximately at 11 degrees with respect to the axis of the dished ring 12 and the pierce 14. The portion 24 lies beyond, covers, and is bonded to the edge 13 along its face 26.

During molding, the ring 12 may be held in position by its inner periphery or pierce 14, but a small amount of clearance, preferably around .003" is permitted to result in a narrow portion 27 bonded to and covering the inner periphery 14, to increase the bond securing the members 11 and 12 together.

In the seal 10 shown in FIGS. 1 to 5, the rubber portion 20 is thicker at its outer extremity than at its inner extremity. In fact, the radial faces 21 and 28 are inclined to each other at an angle of about 4 degrees. This is not always necessary, but it is advisable where a clearance of the installed seal is so specified, as in FIG. 5, that the metal member 12, when installed, necessarily has to be inclined conically at about 4 degrees. In other words, it is always advisable to have the outer face 28 of the seal 10 vertical; it gives a better appearance and discourages tampering, while an inclined outer face looks wrong and often results in ignorant meddling. In other words, where the metal ring 12 must lie at an angle after installation, the outer face 28 may make up the difference in angle and lie flat except at the sealing lip 22.

Figure 7:
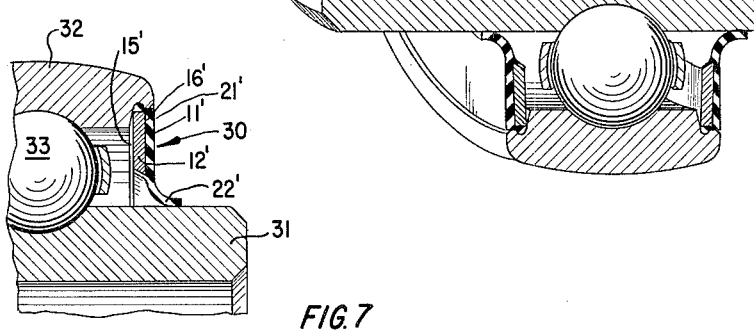
FIG. 7 is a view in elevation and in section showing the seal of FIG. 6 in its installed position.

The seal 30 shown in FIGS. 6 and 7 is substantially identical to the seal of FIGS. 1–5 with the exception that the four faces concerned, 15', 16', 21' and 28' are all parallel. This seal 30 is preferred for installation where there is enough clearance space for the seal ring 12' and rubber ring 11' to lie perpendicular to the inner race 31, which is engaged by the lip 22'. The outer race 32 and ball 33 are similar to their corresponding members in FIGS. 3–5, but the ball 33 is spaced farther from the seal 30.

The seal 10 may be installed in a ball bearing assembly 40 between an inner race 41 and an outer race 42, between which lie a plurality of balls 43. The outer race 42 is preferably provided with a rounded groove 44 between a peripheral ledge 45 and a step or inclined shoulder 46, but other provisions may be made for different purposes.

Since the sealing member 10 is dished as supplied, its rubber outer peripheral portion 24 fits very loosely in the groove 44 and the lip portion 22 does not engage the shaft, as FIG. 3 shows. Therefore, an installation tool 50 is brought to bear against the face 28 of the seal 10. The tool 50 is preferably provided with a central cylindrical portion 51 and an outer annular portion 52 with an annular groove 53 in between. The central portion 51 fits inside the inner race 41; the groove 53 is deep enough to avoid contact at all times of the end 54 with the inner race 30, and the annular rim portion 52 is provided with an inner peripheral face 55 opposite a radial face 56 of the outer race 41 and to bear on the rubber element 11 directly opposite the metal ring 12. As the tool 50 is brought in toward the ball bearing assembly 40 it pushes the seal 10 inwardly until stopped by engagement of the faces 55 and 56 in the position shown in FIG. 4. This stop prevents injury to the seal 10 upon installation. The seal 10 may then be pushed to or slightly beyond its final FIG. 5 position, which it assumes after withdrawal of the tool.

Figure 5:
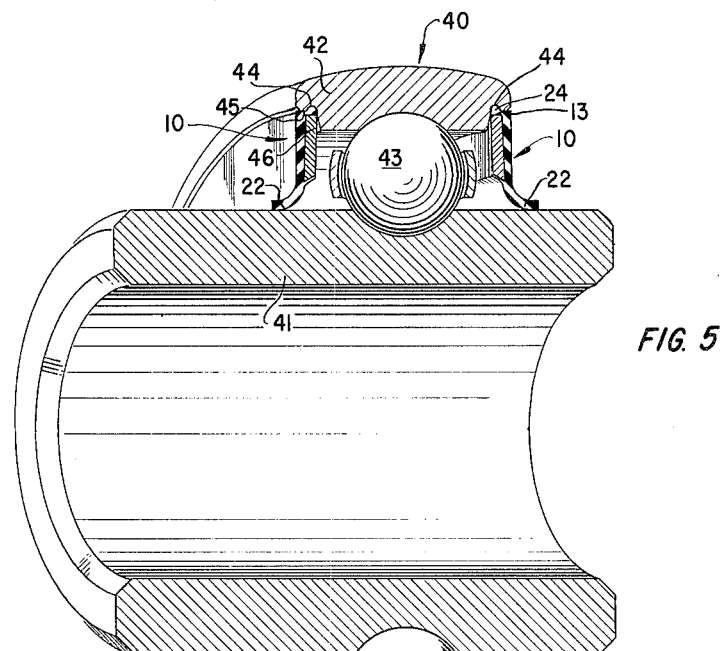
FIG. 5 is a perspective view, partly in section, showing a complete ball bearing assembly with a pair of seals installed according to this invention.

When the tool 50 is withdrawn (FIG. 5), the rubber periphery 25 has been forced into the groove 44, and it will remain there; the steel of the ring 12 being soft it will also remain in the position shown in FIG. 5. The outer periphery 13 of the ring 12 has necessarily been forced outwardly, giving a very tight sealing of the rubber portion 24, gasketing it against the outer race 42. At the same time, the sealing lip 22 is in the proper sealing engagement with the inner race 41. In the instance of the seal 10 shown in FIGS. 1 to 5, the metal member 12 is inclined, as shown in FIG. 5, while the outer face 28 of the rubber member 11 is vertical. In the instance of the seal 30 shown in FIGS. 6 and 7, both the metal member 12' and the rubber member 11' are vertical and parallel. In either event, the inner lip portion 22 or 22' of the wafer seals around the shaft or inner race 41 or 31, its radial width having been increased by the straightening or undishing operation, and it assumes substantially the curve shown in FIG. 5 or FIG. 7, so as to give the proper shaft interference and obtain a good sealing action without substantially increasing the shaft torque.

It will be noted from the drawings that the simplicity of the invention makes its production very inexpensive. Metal members 12 about .030″ to .050″ thick are preferable and the rubber radial portion 11 is preferably about the same thickness. The amount of rubber in the outer peripheral portion 24 is calculated to provide the proper locking for a very tight seal at this point.

The seals 10 and 30 are not adapted to be removed intact; if they must be removed it is advisable to install new previously undistorted seals of the same type again using the same type of installation tool 50. However, the tool 50 will normally be used in the bearing manufacturer's factory, rather than on the job, so that it can be operated by machine methods.

While two forms of the invention have been described in some detail and have been illustrated in the drawing, it is not intended to exclude other modifications which lie within the spirit of the invention as defined in the claims below. To those skilled in the art to which this invention relates, many additional changes will suggest themselves which will not depart from the scope of the claims.

I claim:

1. A fluid seal comprising a thin dished ring of soft metal, having parallel conical side faces, one outer and one inner, an outer periphery and an inner periphery; and an annular rubber member bonded to said inner and outer peripheries and to said outer face and extending substantially parallel to said face and radially inwardly therebeyond to provide a sealing lip portion and radially outwardly therebeyond to provide an outer peripheral portion that serves as a gasket and retaining means when said seal is installed, said seal being adapted to be straightened into a generally radial plane, said sealing lip portion being adapted for flexure upon engagement with a concentric member to be sealed.

2. The seal of claim 1, wherein said ring is dished at approximately 30 degrees.

3. The seal of claim 1 wherein the outer periphery of said rubber member lies, before installation, at an angle of about 11° relative to the axis of said dished ring.

4. The seal of claim 1 wherein said rubber member has an outer face parallel to the face bonded to said ring's outer face.

5. The seal of claim 1 wherein said rubber member has an outer face inclined relative to the face bonded to said ring's outer face.

6. The seal of claim 5 wherein the inclination is about 4° outwardly in the radially outward direction.

7. A fluid seal comprising a thin ring of soft metal dished at approximately 30°, having parallel conical side faces, one outer and one inner, an outer periphery cut off substantially perpendicularly to its parallel faces, and an inner periphery cut off approximately parallel to the axis of said dished ring; and a rubber member bonded to said inner and outer peripheries and to said outer face and extending substantially parallel to said face and radially inwardly therebeyond to provide a sealing lip portion and radially outwardly therebeyond to provide an outer peripheral portion that serves as a gasket and retaining means when said seal is installed, said seal being adapted when installed to be substantially undished into a generally radial plane, said sealing lip portion being adapted to flexure upon engagement with a concentric member to be sealed.

8. A fluid seal comprising a ring of drawing metal about 0.030″ to 0.050″ in thickness, dished at 30° plus or minus about 5°, having parallel conical side faces, one outer and one inner, an outer periphery cut off substantially perpendicularly to its parallel faces, and an inner periphery cut off approximately parallel to the axis of said ring; and an annular rubber member bonded to said outer face and extending substantially parallel to said face and radially inwardly therebeyond a substantial distance to provide a sealing lip portion, said rubber member also having a very thin axial portion bonded to said ring inner periphery, and a thicker portion bonded to said outer periphery and extending radially outwardly therebeyond to provide an outer peripheral portion that serves as a gasket and retaining means when said seal is installed, said seal being adapted upon installation to be substantially undished into a generally radial plane, said sealing lip portion being adapted for flexure upon engagement with a concentric member to be sealed.

9. A fluid seal comprising a thin dished ring of soft metal having parallel conical side faces, one outer and one inner, an outer periphery and an inner periphery; and an elastomeric material bonded to said inner and outer peripheries and to said outer face and extending substantially parallel to said face and radially inwardly therebeyond to provide a sealing lip portion and radially outwardly therebeyond to provide an outer peripheral portion that serves as a gasket and retaining means when said seal is installed, said seal being adapted to be straightened into a generally radial plane, said sealing lip portion being adapted for flexure upon engagement with a concentric member to be sealed.

10. The seal of claim 9 wherein the outer periphery of said rubber member lies, before installation, at an angle of about 11° relative to the axis of said dished ring.

11. The seal of claim 9 wherein said rubber member has an outer face parallel to the face bonded to said ring's outer face.

12. The seal of claim 9 wherein said rubber member has an outer face inclined relative to the face bonded to said ring's outer face.

13. The seal of claim 12 wherein the inclination is about 4° outwardly in the radially outward direction.

14. The seal of claim 9 wherein said ring is dished at approximately 30 degrees.

References Cited by the Examiner

UNITED STATES PATENTS

| | | | |
|---|---|---|---|
| 1,888,361 | 11/1932 | Robinson | 277—237 |
| 2,467,049 | 4/1949 | Peterson | 277—94 |
| 2,509,151 | 5/1950 | Kasten | 277—235 |
| 2,704,676 | 3/1955 | Harding | 285—340 |
| 2,734,757 | 2/1956 | Martin | 277—94 |
| 2,764,433 | 9/1956 | Cobb | 277—94 |
| 2,884,100 | 4/1959 | McKee | 277—235 |

FOREIGN PATENTS 507,620  12/1951  Belgium.

LAVERNE D. GEIGER, *Primary Examiner.*

EDWARD V. BENHAM, LEWIS J. LENNY, *Examiners.*